United States Patent
Kato et al.

Patent Number: 6,058,093
Date of Patent: May 2, 2000

[54] PRE-PIT DETECTING APPARATUS

[75] Inventors: Masahiro Kato; Eiji Muramatsu, both of Tokorozawa, Japan

[73] Assignee: Pioneer Electronic Corporation, Tokyo-to, Japan

[21] Appl. No.: 09/271,985

[22] Filed: Mar. 19, 1999

[30] Foreign Application Priority Data

Mar. 20, 1998 [JP] Japan ................... 10-072795

[51] Int. Cl.[7] .............. G11B 11/03; G11B 11/12
[52] U.S. Cl. .............. 369/100; 369/124; 369/44.41; 369/44.32
[58] Field of Search ................... 369/59, 48, 60, 369/47, 124, 44.32, 44.25, 44.29, 44.35, 44.28, 44.34, 44.26, 44.41

[56] References Cited

U.S. PATENT DOCUMENTS

| | | | |
|---|---|---|---|
| 4,550,394 | 10/1985 | Maeda et al. | 369/44.34 |
| 4,961,182 | 10/1990 | Saito et al. | 369/124 |
| 5,070,492 | 12/1991 | Ogawa et al. | 369/47 |
| 5,297,114 | 3/1994 | Itoh et al. | 369/44.32 |
| 5,406,536 | 4/1995 | Doi | 369/44.28 |
| 5,408,452 | 4/1995 | Sakemoto et al. | 369/44.26 |
| 5,917,793 | 6/1999 | Uchiumi | 369/59 |

OTHER PUBLICATIONS

"Optical Disc System, Applied Physics Academy/Optics Conversazioine Book, published by Asakura Bookstore" (English translation).

*Primary Examiner*—Tan Dinh
*Assistant Examiner*—Kim-Kwok Chu
*Attorney, Agent, or Firm*—Finnegan, Henderson, Farabow, Garrett & Dunner, L.L.P.

[57] ABSTRACT

A pre-pit detecting apparatus detects a pre-pit with respect to an information record medium having a record track and a guide track which is to guide a light beam onto the record track and on which the pre-pit to record control information is formed in advance. The first pre-pit detecting apparatus is provided with: a light receiving device having four divided light detection areas each for receiving a reflection light of the light beam emitted on the record track. The four divided light detection areas are divided such that the reflection light beam is divided by a first division line which is optically in substantially parallel to the record track and a second division line which is optically in substantially orthogonal to the record track. The light receiving device outputs first to fourth light detection signals corresponding to the first to the fourth division areas respectively. The pre-pit detecting apparatus is also provided with: a first difference signal generation device for generating a first difference signal by subtracting the third light detection signal from the first light detection signal; a second difference signal generation device for generating a second difference signal by subtracting the second light detection signal from the fourth light detection signal; a correction device for delaying the second difference signal by a delay time; and a pre-pit detection signal output device for adding the first difference signal and the delayed second difference signal to output it as a pre-pit detection signal.

16 Claims, 10 Drawing Sheets

COMPARISON EXAMPLE

PRE-PIT DETECTING APPARATUS

BACKGROUND OF THE INVENTION

1. Field of the Invention

The present invention relates to a pre-pit detecting apparatus for detecting a pre-pit by which various control information such as address information or the like is recorded in advance, on an information record medium which is repeatedly recordable such as a DVD rewritable (hereinbelow, it is referred to as a DVD-RW) among information record mediums of high density recording types represented by a DVD.

2. Description of the Related Art

On the information record medium such as a DVD-RW, at a pre-formatting stage in advance of the actual recording operation, the pre-pits for carrying various control information such as address information etc., are formed on the disc. Then, when performing the recording or reproducing operation with respect to the information record medium, the control information required for the operation can be obtained by detecting the pre-pits.

For example, in case of the DVD-RW, information pits are formed on a groove track by modulating the reflection coefficient in dependence upon the crystal status or the amorphous status of a recording layer while the pre-pits are formed in advance as phase pits by concave and convex shapes on a land track.

By the way, in an optical pickup for use in reproducing and recording the information with respect to the information record medium, a light receiving element of four-divided type is used so as to realize the focusing servo by means of the astigmatism method and the tracking servo by means of the push-pull method. Therefore, the detection of the pre-pit is performed by using a light receiving element of such type.

For example, a reflection light of a beam spot emitted on the groove track is divided into four light detection areas at the light receiving surface of the light receiving element, and four light detection signals corresponding to these four light detection areas are obtained. Then, a pre-pit formed on the land track is detected by calculating a predetermined function of these detection signals.

However, in case of the information record medium such as a DVD-R for example, the information pit and the pre-pit are constructed such that the substrate is shaped in concave and convex shapes i.e., both of the pre-pit and the information-pit are formed as phase pits so as to give phase differences to the light beam and that the light intensity modulated by the diffraction at the phase pit is detected. Therefore, the detection timing is varied for each of the four light detection areas of the light receiving element, in which the positions of these four light detection areas are positioned with a shift or displacement in a forward or backward direction to each other along the track and/or in an inner or outer direction to each other along the direction across the track (i.e., along the radial direction of the disc), due to the difference in the characteristics such as a diffraction efficiency, a diffraction angle and so on at the phase pit.

Thus, the detection timing of the information pit at the four light detection areas may be delayed or precedent to each other. In addition, the detection signals of the four light detection areas may be changed in directions different from each other i.e., may be in such a direction to reduce the light intensity or to increase the light intensity. Accordingly, the peaks of the changing portions in the detection signals due to the pre-pit are not coincident in a time axis with each other because of the delay time. As a result, the pre-pit detectable range i.e., the detection margin, in which a threshold to detect the pre-pit is appropriately set, is in fact reduced. By this reduction of the detection margin, the pre-pit detection accuracy is certainly degraded, and the possibility of an erroneous operation due to a noise is increased by the degradation, which is a problem.

SUMMARY OF THE INVENTION

It is therefore an object of the present invention to provide a pre-pit detecting apparatus, which can prevent the degradation of the detection margin for the pre-pit due to the detection delay, and in which the detection accuracy can be improved and the influence of the noise is restrained.

The above object of the present invention can be achieved by a first pre-pit detecting apparatus for detecting a pre-pit with respect to an information record medium comprising (i) a record track on which record information can be recorded and (ii) a guide track which is to guide a light beam onto the record track and on which the pre-pit to record control information is formed in advance of recording the record information. The first pre-pit detecting apparatus is provided with: a light receiving device having four divided light detection areas each for receiving a reflection light of the light beam emitted on the record track. The four divided light detection areas are divided such that the reflection light beam at the light receiving device is divided by a first division line which is optically in substantially parallel to the record track and a second division line which is optically in substantially orthogonal to the record track. The four divided light detection areas have (A) a first division area optically positioned on a side, which is close to the guide track where the pre-pit is formed, of the first division line and on a side, which is opposite to an advancing direction of the light beam, of the second division line, (B) a second division area positioned on a side, which is opposite to the guide track where the pre-pit is formed, of the first division line and on the side, which is opposite to the advancing direction of the light beam, of the second division line, (C) a third division area positioned on the side, which is opposite to the guide track where the pre-pit is formed, of the first division line and on a side, which is in the advancing direction of the light beam, of the second division line and (D) a fourth division area positioned on the side, which is close to the guide track where the pre-pit is formed, of the first division line and on the side, which is in the advancing direction of the light beam, of the second division line. The light receiving device outputs first to fourth light detection signals corresponding to the first to the fourth division areas respectively. The first pre-pit detecting apparatus is also provided with: a first difference signal generation device for generating a first difference signal by subtracting the third light detection signal from the first light detection signal; a second difference signal generation device for generating a second difference signal by subtracting the second light detection signal from the fourth light detection signal; a correction device for delaying the second difference signal by a delay time, which is set in advance in correspondence with a time difference between a light receiving timing of the light receiving device on the side, which is in the advancing direction of the light beam, of the second division line and that on the side, which is opposite to the advancing direction of the light beam, of the second division line, to output the delayed second difference signal; a pre-pit detection signal output device for adding the first difference signal and the delayed second difference signal to output it as a pre-pit detection signal; and a pre-pit detector for detecting the pre-pit on the basis of the pre-pit detection signal by using a predetermined threshold.

According to the first pre-pit detecting apparatus of the present invention, the reflection light of the light beam emitted on the record track is received by each of the first to fourth light detection areas of the light receiving device, and the first to fourth light detection signals corresponding to the first to the fourth division areas are respectively outputted from the light receiving device. Then, the first difference signal is generated by subtracting the third light detection signal from the first light detection signal, by the first difference signal generation device. On the other hand, the second difference signal is generated by subtracting the second light detection signal from the fourth light detection signal, by the second difference signal generation device. Then, the second difference signal is delayed by the delay time, and the delayed second difference signal is outputted by the correction device. Then, the first difference signal and the delayed second difference signal are added together, and it is outputted as the pre-pit detection signal, by the pre-pit detection signal output device. Finally, the pre-pit is detected by the pre-pit detector on the basis of the pre-pit detection signal by using a predetermined threshold.

Accordingly, the changing components due to the information pit in the light detection signals detected by the first to the fourth division areas, at the time of detecting the pre-pit, can be canceled in the pre-pit detection signal obtained by the above described procedure. On the other hand, the changing components due to the pre-pit in the light detection signals detected by the first to the fourth division areas are added together in such a manner to be amplified in the pre-pit detection signal, since the delay time is canceled and the peaks of the changing components are coincidental to each other in the pre-pit detection signal. Therefore, the detection margin can be maximized and the pre-pit can be accurately and certainly detected on the basis of the pre-pit detection signal, by using the threshold set in the detection margin, so that the influence of the fluctuation of the light detection signal due to a noise etc., can be drastically reduced according to the first pre-pit detecting apparatus of the present invention.

The above object of the present invention can be also achieved by a second pre-pit detecting apparatus for detecting a pre-pit with respect to an information record medium comprising (i) a record track on which record information can be recorded and (ii) a guide track which is to guide a light beam onto the record track and on which the pre-pit to record control information is formed in advance of recording the record information. The second pre-pit detecting apparatus is provided with: a light receiving device having four divided light detection areas each for receiving a reflection light of the light beam emitted on the record track. The four divided light detection areas are divided such that the reflection light beam at the light receiving device is divided by a first division line which is optically in substantially parallel to the record track and a second division line which is optically in substantially orthogonal to the record track. The four divided light detection areas have (A) a first division area optically positioned on a side, which is close to the guide track where the pre-pit is formed, of the first division line and on a side, which is opposite to the light beam, of the second division line, (B) a second division area positioned on a side, which is opposite to the guide track where the pre-pit is formed, of the first division line and on the side, which is opposite to the light beam, of the second division line, (C) a third division area positioned on the side, which is opposite to the guide track where the pre-pit is formed, of the first division line and on a side, which is in the advancing direction of the light beam, of the second division line and (D) a fourth division area positioned on the side, which is close to the guide track where the pre-pit is formed, of the first division line and on the side, which is in the advancing direction of the light beam, of the second division line. The light receiving device outputs first to fourth light detection signals corresponding to the first to the fourth division areas respectively. The second pre-pit detecting apparatus is also provided with: a first correction device for delaying the second light detection signal by a delay time, which is set in advance in correspondence with a time difference between a light receiving timing of the light receiving device on the side, which is in the advancing direction of the light beam, of the second division line and that on the side, which is opposite to the advancing direction of the light beam, of the second division line, to output the delayed second light detection signal; a second correction device for delaying the fourth light detection signal by the delay time, to output the delayed fourth light detection signal; a first addition device for adding the first light detection signal and the delayed fourth light detection signal to output it as a first addition signal; a second addition device for adding the third light detection signal and the delayed second light detection signal to output it as a second addition signal; a pre-pre detection signal output device for generating a pre-pit detection signal by subtracting the second addition signal from the first addition signal; and a pre-pit detector for detecting the pre-pit on the basis of the pre-pit detection signal by using a predetermined threshold.

According to the second pre-pit detecting apparatus of the present invention, the reflection light of the light beam emitted on the record track is received by each of the first to fourth light detection areas of the light receiving device, and the first to fourth light detection signals corresponding to the first to the fourth division areas are respectively outputted from the light receiving device. Then, the second light detection signal is delayed by the delay time, and the delayed second light detection signal is outputted by the first correction device. On the other hand, the fourth light detection signal is delayed by the delay time, and the delayed fourth light detection signal is outputted by the a second correction device. Then, the first light detection signal and the delayed fourth light detection signal are added together, and it is outputted as the first addition signal, by the first addition device. On the other hand, the third light detection signal and the delayed second light detection signal are added together, and it is outputted as the second addition signal, by the second addition device. Then, the pre-pit detection signal is generated by subtracting the second addition signal from the first addition signal, by the pre-pre detection signal output device. Finally, the pre-pit is detected by the pre-pit detector, on the basis of the pre-pit detection signal by using a predetermined threshold.

Accordingly, the changing components due to the information pit can be canceled in the pre-pit detection signal. On the other hand, the changing components due to the pre-pit are added together in such a manner to be amplified in the pre-pit detection signal, since the delay time is canceled and the peaks of the changing components are coincidental to each other in the pre-pit detection signal. Therefore, the detection margin can be maximized and the pre-pit can be accurately and certainly detected on the basis of the pre-pit detection signal, by using the threshold set in the detection margin, so that the influence of the fluctuation of the light detection signal due to a noise etc., can be drastically reduced according to the second pre-pit detecting apparatus of the present invention.

In one aspect of the first or second pre-pit detecting apparatus of the present invention, the record track is a groove track, and the guide track is a land track.

According to this aspect, the detection of the information pit on the groove track can be performed by emitting the light beam onto the groove track, and the detection of the pre-pit on the land track can be separately performed by emitting the light beam onto the land track, which is adjacent to the groove track. Therefore, between the detection of the information pit and the detection of the pre-pit, the mutual influence can be reduced, so that the pre-pit detection can be accurately performed.

In another aspect of the first or second pre-pit detecting apparatus of the present invention, the pre-pit is a phase pit shaped in a concave and convex shape of the guide track while the record information is recorded as a change in a reflection coefficient of the record track.

According to this aspect, the detection of the information pit which is recorded as the change in the reflection coefficient of the record track can be performed by emitting the light beam onto the record track, and the detection of the pre-pit which is the phase pit on the guide track can be separately performed by emitting the light beam onto the guide track. Therefore, between the detection of the information pit and the detection of the pre-pit, the mutual influence can be reduced while the delay time itself at the time of detecting the information pit is relatively small or nil, so that the pre-pit detection can be accurately performed.

In another aspect of the first or second pre-pit detecting apparatus of the present invention, the correction device has a programmable delay line controlled by a CPU.

According to this aspect, the second difference signal can be appropriately delayed by the delay time, by the programmable delay line controlled by the CPU in the first pre-pit detecting apparatus. Alternatively, the second light detection signal and the fourth light detection signal can be appropriately delayed by the delay time, by the programmable delay line controlled by the CPU in the second pre-pit detecting apparatus. Therefore, the pre-pit can be even more accurately and certainly detected on the basis of the pre-pit detection signal.

The above object of the present invention can be also achieved by a third pre-pit detecting apparatus for detecting a pre-pit with respect to an information record medium comprising (i) a record track on which record information can be recorded and (ii) a guide track which is to guide a light beam onto the record track and on which the pre-pit to record control information is formed in advance of recording the record information. The third pre-pit detecting apparatus is provided with: a light receiving device, which is same as that of the above described first or second pre-pit detecting apparatus of the present invention; a difference signal generation device for generating a difference signal by subtracting the second light detection signal from the fourth light detection signal; a correction device for delaying the difference signal by a delay time, which is set in advance in correspondence with a time difference between a light receiving timing of the light receiving device on the side, which is in the advancing direction of the light beam, of the second division line and that on the side, which is opposite to the advancing direction of the light beam, of the second division line, to output the delayed difference signal; a pre-pit detection signal output device for outputting (the first light detection signal−the third light detection signal+the delayed difference signal) as a pre-pit detection signal; and a pre-pit detector for detecting the pre-pit on the basis of the pre-pit detection signal by using a predetermined threshold.

According to the third pre-pit detecting apparatus of the present invention, in the same manner as the above described first pre-pit detecting apparatus of the present invention, the detection margin can be maximized and the pre-pit can be accurately and certainly detected, so that the influence of the fluctuation of the light detection signal due to a noise etc., can be drastically reduced.

The above object of the present invention can be also achieved by a fourth pre-pit detecting apparatus for detecting a pre-pit with respect to an information record medium comprising (i) a record track on which record information can be recorded and (ii) a guide track which is to guide a light beam onto the record track and on which the pre-pit to record control information is formed in advance of recording the record information. The fourth pre-pit detecting apparatus is provided with: a light receiving device, which is same as that of the above described first or second pre-pit detecting apparatus of the present invention; a difference signal generation device for generating a difference signal by subtracting the fourth light detection signal from the second light detection signal; a correction device for delaying the difference signal by a delay time, which is set in advance in correspondence with a time difference between a light receiving timing of the light receiving device on the side, which is in the advancing direction of the light beam, of the second division line and that on the side, which is opposite to the advancing direction of the light beam, of the second division line, to output the delayed difference signal; a pre-pit detection signal output device for outputting (the first light detection signal−the third light detection signal−the delayed difference signal) as a pre-pit detection signal; and a pre-pit detector for detecting the pre-pit on the basis of the pre-pit detection signal by using a predetermined threshold.

According to the fourth pre-pit detecting apparatus of the present invention, in the same manner as the above described first pre-pit detecting apparatus of the present invention, the detection margin can be maximized and the pre-pit can be accurately and certainly detected, so that the influence of the fluctuation of the light detection signal due to a noise etc., can be drastically reduced.

The above object of the present invention can be also achieved by a fifth pre-pit detecting apparatus for detecting a pre-pit with respect to an information record medium comprising (i) a record track on which record information can be recorded and (ii) a guide track which is to guide a light beam onto the record track and on which the pre-pit to record control information is formed in advance of recording the record information. The fifth pre-pit detecting apparatus is provided with: a light receiving device, which is same as that of the above described first or second pre-pit detecting apparatus of the present invention; a first correction device for delaying the second light detection signal by a delay time, which is set in advance in correspondence with a time difference between a light receiving timing of the light receiving device on the side, which is in the advancing direction of the light beam, of the second division line and that on the side, which is opposite to the advancing direction of the light beam, of the second division line, to output the delayed second light detection signal; a second correction device for delaying the fourth light detection signal by the delay time, to output the delayed fourth light detection signal; a pre-pit detection signal output device for outputting (the first light detection signal−the third light detection signal+the delayed fourth light detection signal−the delayed second light detection signal) as a pre-pit detection signal; and a pre-pit detector for detecting the pre-pit on the basis of the pre-pit detection signal by using a predetermined threshold.

According to the fifth pre-pit detecting apparatus of the present invention, in the same manner as the above described second pre-pit detecting apparatus of the present invention, the detection margin can be maximized and the pre-pit can be accurately and certainly detected, so that the influence of the fluctuation of the light detection signal due to a noise etc., can be drastically reduced.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained. In the embodiments described below, the present invention is applied to a pre-pit detecting apparatus for a DVD-RW.

Figure 1:
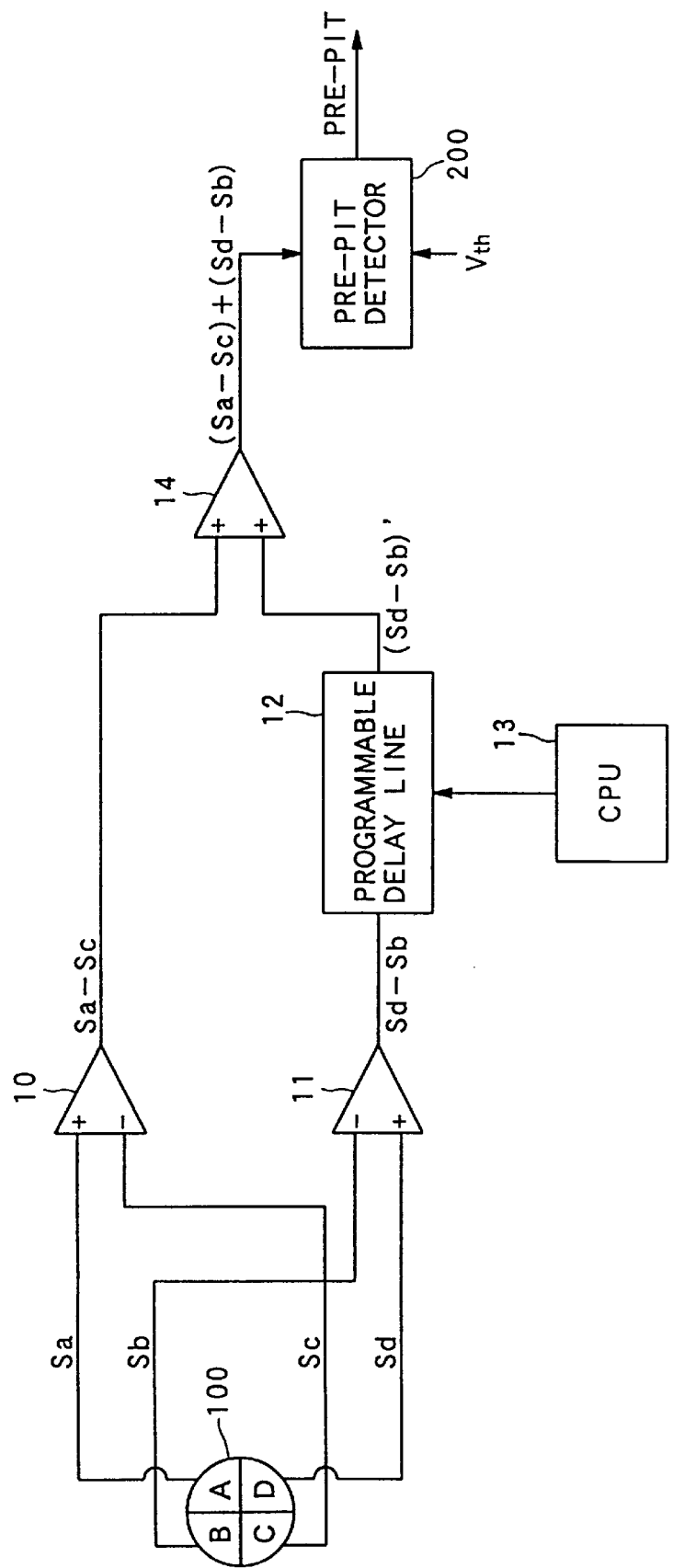
FIG. 1 is a block diagram of a pre-pit detecting apparatus as a first embodiment of the present invention.
Figure 2:
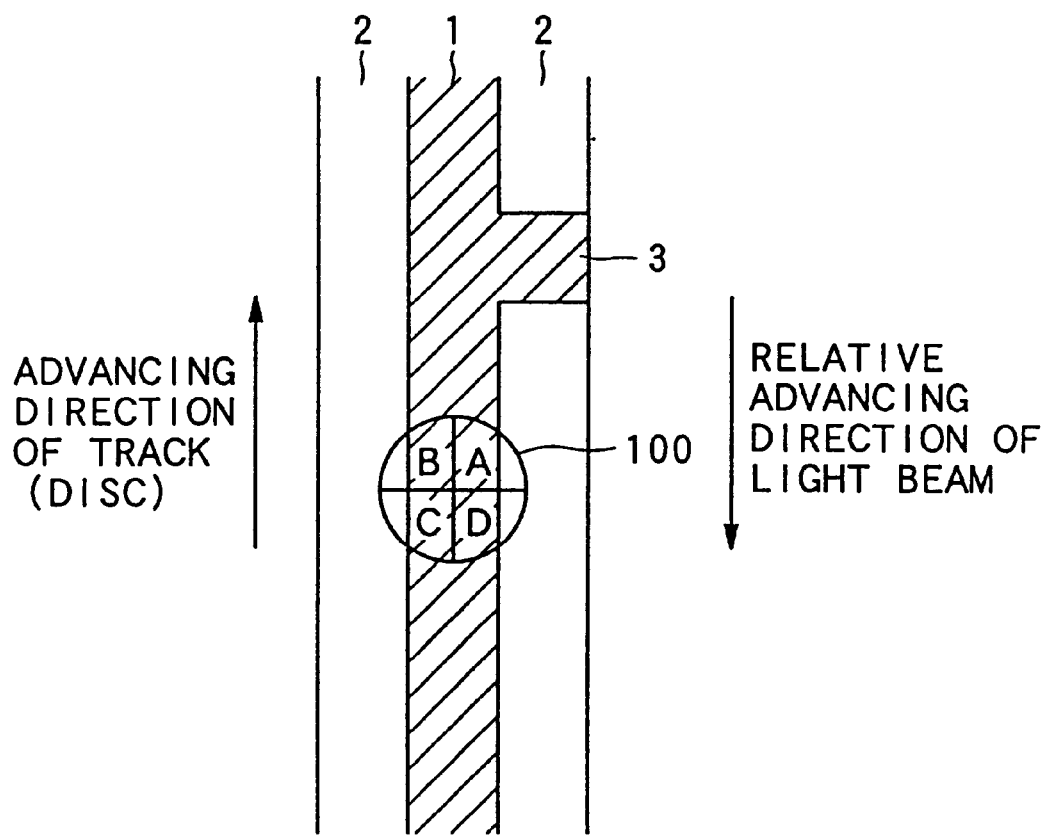
FIG. 2 is a diagram showing a light receiving element of four divided type with respect to a reflection light of a beam spot on an information record medium in the first embodiment.

FIG. 1 shows a schematic construction of a first embodiment of a pre-pit detecting apparatus for a DVD-RW of the present invention. FIG. 2 shows a light receiving element of four divided type with respect to a reflection light of a beam spot on the DVD-RW.

In FIG. 1, a pre-pit detecting apparatus of the first embodiment is provided with subtracters 10 and 11, a programmable delay line 12, a CPU (Central Processing Unit) 13, and an adder 14.

By the signal processes of the subtracters 10 and 11, the programmable delay line 12, the CPU 13, and the adder 14, a pre-pit detection signal is obtained to be outputted from the adder 14.

The pre-pit detecting apparatus of the first embodiment is also provided with a pre-pit detector 200 for actually detecting the pre-pit on the basis of the pre-pit detection signal outputted from the adder 14, by using a predetermined threshold value Vth as described later.

In FIG. 2, a light receiving element 100 for the pre-pit detecting apparatus has four divided light detection areas A to D. The reflection light of a beam spot emitted on a groove track 1 of the DVD-RW is separately detected by the four divided light detection areas A to D, and light detection signals Sa to Sd corresponding to these four light detection areas A to D are obtained. In the present embodiment, a pre-pit 3 formed on a land track 2 is detected by obtaining $(Sa-Sc)+(Sd-Sb)'$ of these four light detection signals Sa to Sd as described below. The information pit is formed on the groove track 1 by modulating the reflection coefficient in dependence upon the crystal status or the amorphous status of a recording layer of the DVD-RW while the pre-pit 3 is formed in advance as a phase pit.

Figure 3:
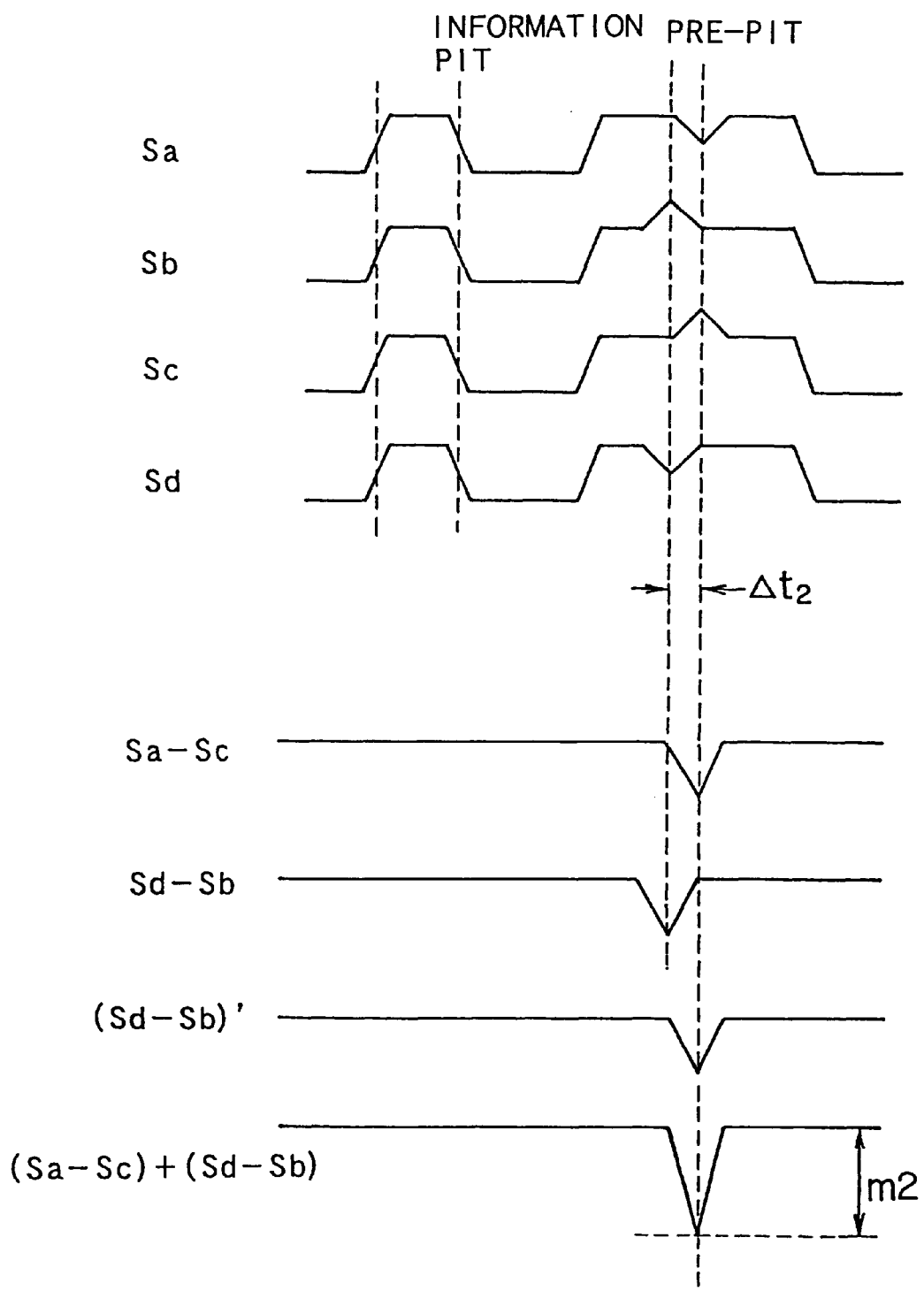
FIG. 3 is a pattern diagram of detection signals in a pre-pit detection by the first embodiment.

Here, with reference to FIG. 3, the patterns of the light detection signals Sa to Sd obtained by the first embodiment are explained.

As shown in FIG. 3, the information pit on the groove track 1 is firstly detected, whose detection timings are not delayed to each other. Namely, the changes of the light detection signals Sa to Sd due to the information pit happen at the same timings to each other when detecting the information pit.

Since the information pit is not the phase pit but the change in the reflection coefficient in dependence upon the crystal status or the amorphous status of the recording layer of the DVD-RW is detected in case of the DVD-RW, the detection delay of the four divided detection areas A to D due to the difference in the diffraction characteristics based on the phase differences of the light beam is not caused.

This point is known by "Optical Disc System, Applied Physics Academy/Optics Conversazione Book, published by Asakura Bookstore" and so on.

Here, a comparison example, in which both of the information pit and the pre-pit are formed as the phase pits as in the case of the DVD-R is explained with reference to FIG. 4.

In the comparison example, the detection of the information pit and the pre-pit (i.e., the phase pits) are performed by the light receiving element 100 having four divided light detection areas A to D as shown in FIG. 2. Especially, in the comparison example, the pre-pit 3 on the land track 2 is detected by obtaining $(Sa-Sb)+(Sd-Sc)$ of these four light detection signals Sa to Sd. Thus, it is necessary to consider the delay of the detection signals due to the characteristic of the phase pit. Namely, the detection timing is varied for each of the four light detection areas A to D due to the difference in the characteristics such as a diffraction efficiency, a diffraction angle and so on at the phase pit.

Figure 4:
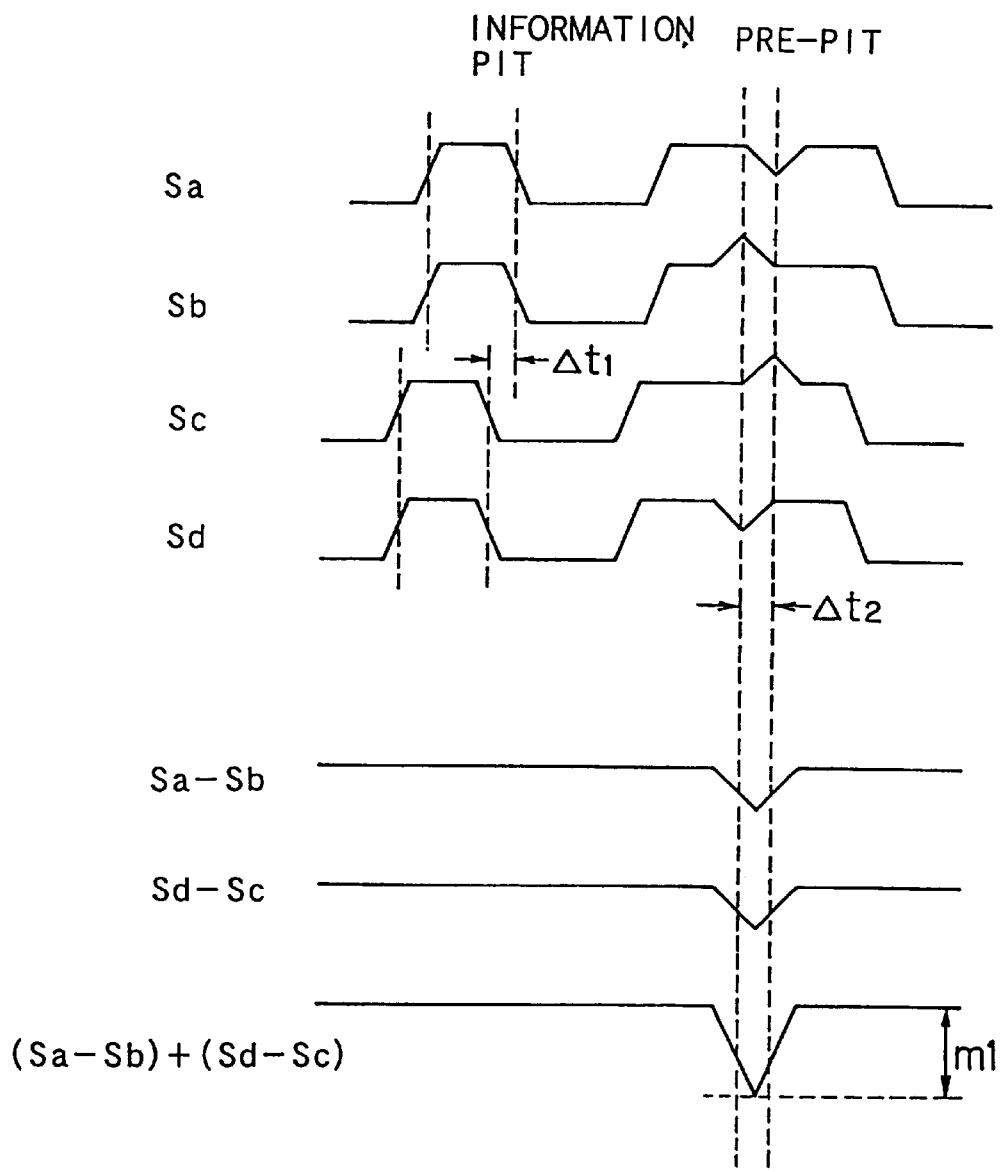
FIG. 4 is a pattern diagram of detection signals in a pre-pit detection in a comparison example.

As shown in FIG. 4, since the light detection areas C and D are positioned forward in a relative advancing direction of the light beam with respect to the optical disc, and since the light detection areas A and B are positioned backward in the relative advancing direction of the light beam (as shown in FIG. 2), the detection timing of the information pit at the light detection area A and B is delayed by Δt1. On the other hand, the detection timing of the pre-pit at the light detection areas B and D is precedent while that at the light detection areas A and C is delayed by Δt2 as a result of a complex diffraction characteristic since the beam spot is on the groove track 1 and the pre-pit 3 is on the land track 2. In addition, the light detection signals Sa and Sd are changed in such a direction to reduce the light intensity while the light detection signals Sb and Sc are changed in such a direction to increase the light intensity.

In the comparison example, when the value of Sa−Sb and the value of Sd−Sc are respectively calculated, the changing component due to the information pit is canceled in each of these calculated values, so that only the changing component due to the pre-pit remains. Finally, by calculating (Sa−Sb)+(Sd−Sc) as a pre-pit detection signal, the pre-pit is detected on the basis of this pre-pit detection signal by using a predetermined threshold. At this time, in case that the aforementioned delay time Δt2 is zero, the pre-pit detectable range m1 i.e., the detection margin is supposed to be increased. However, the peaks of the changing portions in the detection signals due to the pre-pit are not coincident in the time axis with each other because of the delay time Δt2, resulting in that the pre-pit detectable range m1 is in fact reduced as shown in FIG. 4.

As described above in detail, the pre-pit detection accuracy is certainly degraded, and the possibility of an erroneous operation due to a noise is increased by the degradation, according to the comparison example because of the reduction of the detection margin m1.

In contrast to this, as shown in FIG. 3, the detection delay Δt1 of the light detection areas A to D due to the difference in the diffraction characteristics based on the phase differences of the light beam is not caused in the first embodiment.

As shown in FIG. 3, after the information pit on the groove track 1 is detected, the pre-pit 3 on the land track 2 is detected. In this case, the light detection signals Sa to Sd change in the same manner as the comparison example (refer to FIG. 4), so that the light detection signals Sa and Sc are delayed by Δt2 with respect to the light detection signals Sb and Sd. This is because the pre-pit 3, which is formed in advance of shipping the DVD-RW and to which re-writing is not necessary, is the phase pit shaped in the concave and convex shape in the same manner as the comparison example. In addition, the change in the light intensities of the four light detection areas A to D are in the same manner as the comparison example (refer to FIG. 4).

In FIG. 1, the light detection signals Sa and Sc are inputted to the subtracter 10. Then, by the subtracter 10, the difference between the light detection signals Sa and Sc is calculated, and the difference signal corresponding to Sa−Sc is outputted. As a result, the difference signal Sa−Sc changes in the pattern shown in FIG. 3. Namely, the change due to the information pit is canceled in the difference signal Sa−Sc so that the difference signal Sa−Sc has an waveform pattern in which only the change corresponding to the pre-pit 3 appears.

On the other hand, in FIG. 1, the light detection signals Sb and Sd are inputted to the subtracter 11. Then, by the subtracter 11, the difference between the light detection signals Sb and Sd is calculated, and the difference signal corresponding to Sd−Sb is outputted. As a result, the difference signal Sd−Sb changes in the pattern shown in FIG. 3. Namely, the change due to the information pit is canceled in the difference signal Sd−Sb so that the difference signal Sd−Sb has an waveform pattern in which only the change corresponding to the pre-pit 3 appears.

At this time, the changing direction of the difference signal Sa−Sc is same as that of the difference signal Sd−Sb. The changing peak of the difference signal Sa−Sc is delayed by Δt2 with respect to that of the difference signal Sd−Sb. Therefore, the present embodiment is constructed, as shown in FIG. 1, such that the difference signal Sd−Sb is inputted to the programmable delay line 12 as a correction device, and a corrected difference signal (Sd−Sb)' in which the delay time Δt2 is canceled is outputted therefrom.

The programmable delay line 12 holds the inputted difference signal Sd−Sb for the delay time which is set by the CPU 13, and outputs the corrected difference signal (Sd−Sb)' which is timely shifted by the set delay time. For example, by use of a time measurement device, the timing to output the corrected difference signal (Sd−Sb)' may be set with respect to the timing at which the difference signal Sd−Sb is inputted. Incidentally, a memory capacity enough to hold the difference signal Sd−Sb corresponding to the set delay time D is necessary for the programmable delay line 12.

The CPU 13 sets the delay time with respect to the programmable delay line 12. Here, a plurality of delay times to be set may be prepared, so that specific one of them may be selected. Namely, although it is desirable to set the delay time coincident to the delay time Δt2, the delay time Δt2 actually varies depending upon the type of the optical disc and the linear velocity of the optical disc. Therefore, it is preferable to select and set one of a plurality of delay times to be set, which is the closest to the Δt2.

Next, the difference signal Sa−Sc outputted from the subtracter 10 and the corrected difference signal (Sd−Sb)' outputted from the programmable delay line 12 are inputted to the adder 14. By the adder 14, the difference signal Sa−Sc and the corrected difference signal (Sd−Sb)' added, and the pre-pit detection signal (Sa−Sc)+(Sd−Sb)' is outputted therefrom.

At this time, as shown in FIG. 3, the changing pattern of the difference signal Sa−Sc with respect to the pre-pit 3 is same as that of the corrected difference signal (Sd−Sb)'. Further, the changing timing and the changing peak of the difference signal Sa−Sc with respect to the pre-pit 3 are same as those of the corrected difference signal (Sd−Sb)'. Therefore, the pre-pit detection signal (Sa−Sc)+(Sd−Sb)' outputted from the adder 10 changes at the same timing as the difference signal Sa−Sc and the corrected difference signal (Sd−Sb)'. The changing peak of the pre-pit detection signal (Sa−Sc)+(Sd−Sb)' appears twice as large as those of the difference signal Sa−Sc and the corrected difference signal (Sd−Sb)'. By this, the pre-pit detectable range m2 (i.e., the detection margin) is certainly larger than the pre-pit detectable range m1 in the comparison example (refer to FIG. 4).

Then, the pre-pit detector 200 actually detects the pre-pit 3 on the basis of the pre-pit detection signal (Sa−Sc)+(Sd−Sb)', by using the predetermined threshold value Vth, which can be set in the pre-pit detectable range m2.

By appropriately setting the threshold value Vth in this pre-pit detectable range m2, the judgment or detection of the pre-pit 3 is performed in accordance with whether or not the pre-pit detection signal (Sa−Sc)+(Sd−Sb)' exceeds the set threshold value Vth by the pre-pit detector 200. At this time, in case that the light intensity of the reflection light of the light beam which is received by the light receiving element fluctuates due to an influence of a noise etc., as the pre-pit detectable range m2 is the larger, the less influence of this fluctuation is caused in the pre-pit signal detection by the pre-pit detector 200 since the enough detection margin can be ensured in the pre-pit detector 200. Thus, according to the pre-pit detecting apparatus of the first embodiment, the detection accuracy can be certainly improved, and the excellent detection capability can be realized.

Figure 5:
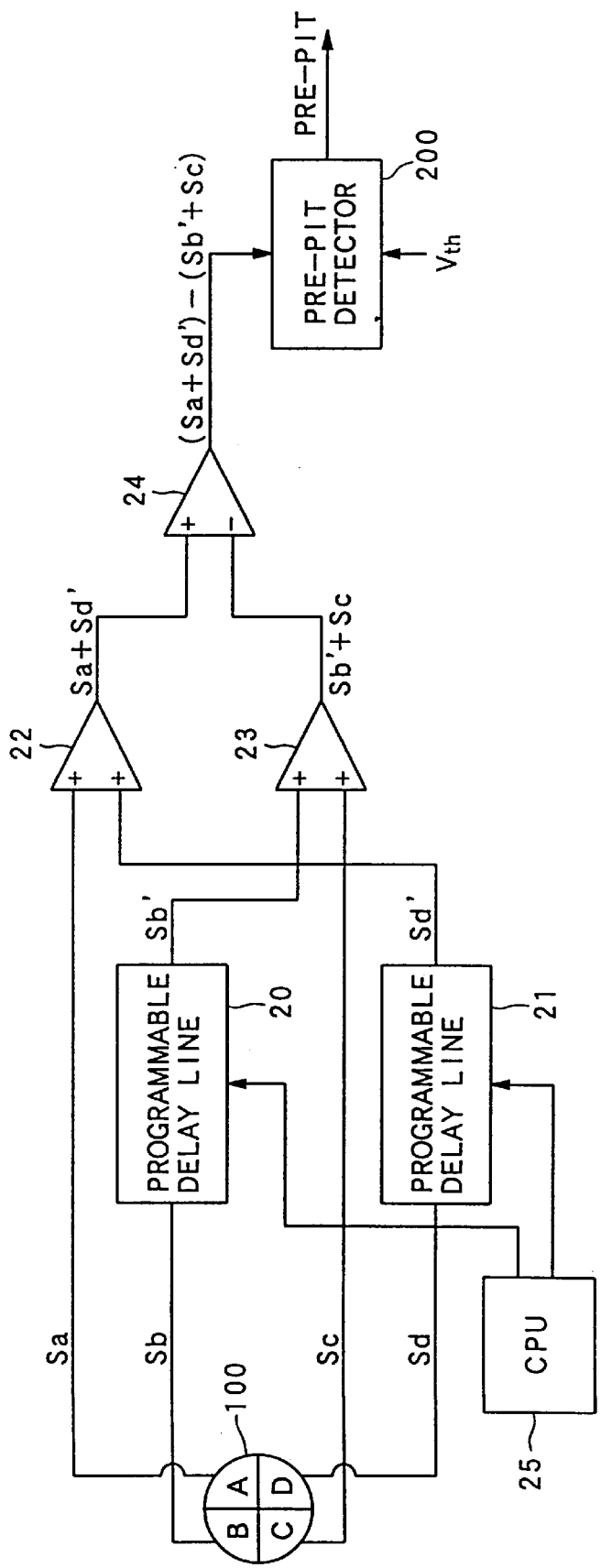
FIG. 5 is a block diagram of a pre-pit detecting apparatus as a second embodiment of the present invention.

FIG. 5 shows a schematic construction of a second embodiment of a pre-pit detecting apparatus for a DVD-RW of the present invention. In the second embodiment, the structure of the DVD-RW and the relationship between the division shape of the light receiving element of four divided type used in the pre-pit detecting apparatus and the beam spot are the same as those of the first embodiment (refer to FIG. 2).

In FIG. 5, a pre-pit detecting apparatus of the second embodiment is provided with programmable delay lines 20 and 21, adders 22 and 23, a subtracter 24 and a CPU 25. The pre-pit detecting apparatus of the second embodiment is also provided with the pre-pit detector 200 for actually detecting the pre-pit on the basis of the pre-pit detection signal outputted from the subtracter 24, by using the predetermined threshold value Vth.

The light receiving element 100 having the four divided light detection areas A to D for respectively outputting the light detection signals Sa to Sd is also provided in the pre-pit detecting apparatus of the second embodiment. In the present embodiment, the pre-pit 3 formed on the land track 2 (refer to FIG. 2) is detected by obtaining (Sa+Sd')−(Sb'+Sc) of these four light detection signals Sa to Sd as described below.

Figure 6:
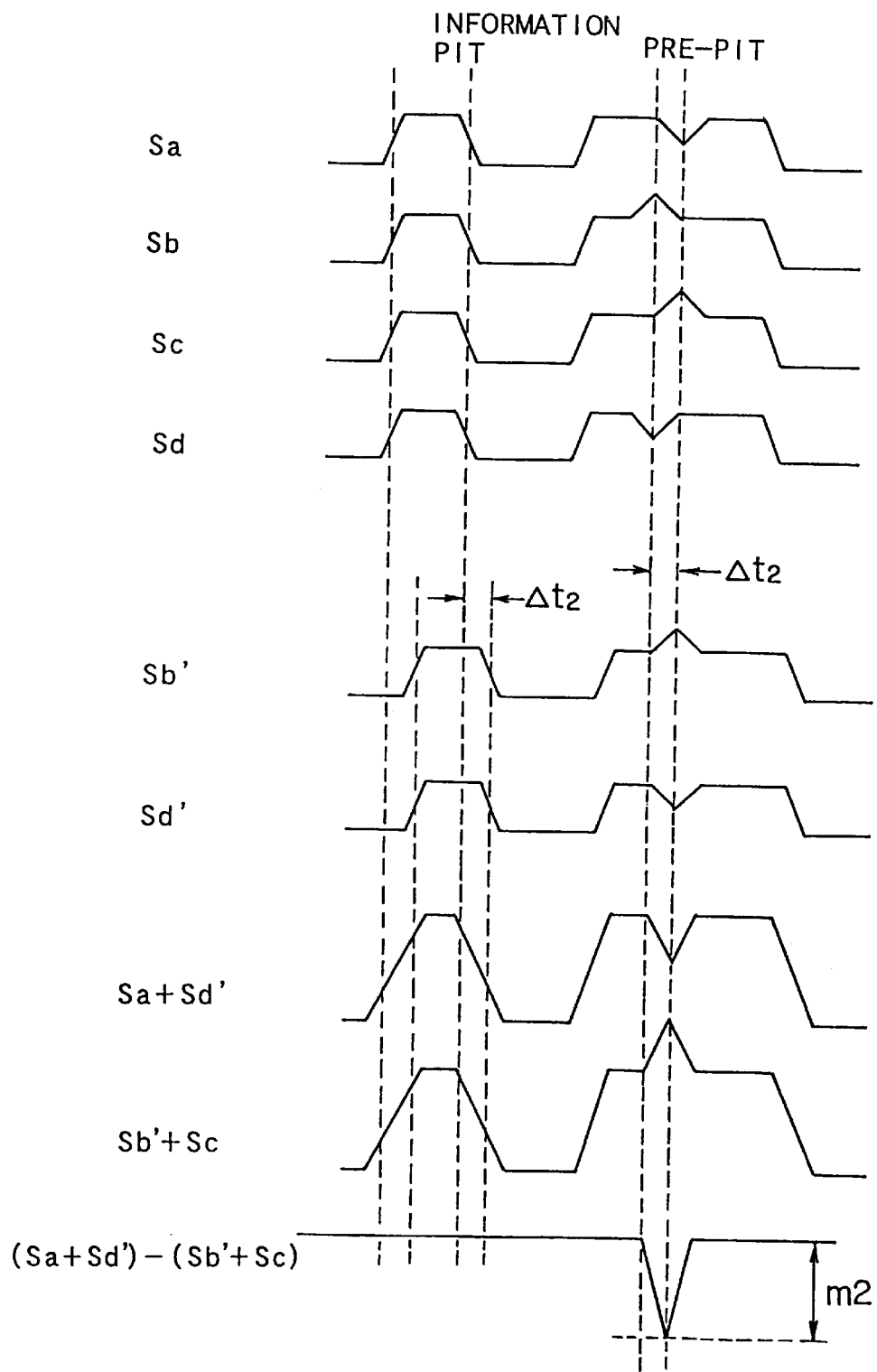
FIG. 6 is a pattern diagram of detection signals in a pre-pit detection by the second embodiment.

Here, with reference to FIG. 6, the patterns of the light detection signals Sa to Sd obtained by the second embodiment are explained.

As shown in FIG. 6, the patterns of the light detection signals Sa to Sd obtained by the second embodiment change in the same manner as the first embodiment (refer to FIG. 3). Namely, at the time of detecting the information pit, the detection patterns of the light detection signals Sa to Sd change at the same timings to each other, and at the time of detecting the pre-pit, the light detection signals Sa and Sc are delayed by Δt2 with respect to the light detection signals Sb and Sd.

Therefore, the present embodiment is constructed, as shown in FIG. 5, such that the light detection signals Sb and Sd, whose detection patterns are precedent to those of the light detection signals Sa and Sc at the time of detecting the pre-pit, are respectively delayed in advance of the adding processes. Then, the corrected detection signals Sb' and Sd' and the light detection signals Sa and Sc, whose changing timings are the same to each other, are used for the pre-pit detection.

More concretely, in FIG. 5, the light detection signal Sb is inputted to the programmable delay line 20, is held thereby for the delay time set by the CPU 25, and is outputted therefrom as a corrected signal Sb' after being shifted in the time axis by the set delay time. On the other hand, the light detection signal Sd is inputted to the programmable delay line 21, is held thereby for the delay time set by the CPU 25, and is outputted therefrom as a corrected signal Sd' after being shifted in the time axis by the set delay time.

Incidentally, the delay times of the programmable delay lines 20 and 21 may be set to the same value to each other by the CPU 25. Alternatively, the optimum one of a plurality of delay times to be set may be selected and set in the same manner as the first embodiment.

Then, the light detection signal Sa and the corrected signal Sd' outputted from the programmable delay line 21 are inputted to the adder 22. By the adder 22, the light detection signal Sa and the corrected signal Sd' are added together, and an addition signal Sa+Sd is outputted therefrom. As a result, the addition signal Sa+Sd' changes in the pattern shown in FIG. 6, so that an waveform in which the changing component corresponding to the information pit and the changing component corresponding to the pre-pit 3 are included is obtained.

On the other hand, the light detection signal Sc and the corrected signal Sb' outputted from the programmable delay line 20 are inputted to the adder 23. By the adder 23, the light detection signal Sc and the corrected signal Sb' are added together, and an addition signal Sb'+Sc is outputted therefrom. As a result, the addition signal Sb'+Sc changes in the patter shown in FIG. 6, so that an waveform in which the changing component corresponding to the information pit and the changing component corresponding to the pre-pit 3 are included is obtained.

Then, the addition signal Sa+Sd' outputted from the adder 22 and the addition signal Sb'+Sc outputted from the adder 23 are inputted to the subtracter 24. By the subtracter 24, the difference between the addition signal Sa+Sd' and the addition signal Sb'+Sc are calculated, and a pre-pit detection signal (Sa+Sd')−(Sb'+Sc) is outputted.

As a result, the changing component due to the information pit included in the addition signal (Sa+Sd') and that included in the addition signal (Sb'+Sc) are canceled with each other in the pre-pit detection signal (Sa+Sd')−(Sb'+Sc). On the other hand, the changing timings of the light detection signals Sa and Sc and the corrected signals Sb' and Sd' with respect to the pre-pit 3 are the same to each other, and the changing peaks of the light detection signals Sa and Sc and the corrected signals Sb' and Sd' with respect to the pre-pit 3 are in the same directions to each other. Therefore, the pre-pit detection signal (Sa+Sd')−(Sb'+Sc) has the waveform pattern same as that of the pre-pit detection signal (Sa−Sc)+(Sd−Sb)' in the first embodiment. Namely, between the first embodiment and the second embodiment, only the order of applying the corrections with respect to the additions and subtractions are different from each other. Thus, the pre-pit detection signal (Sa+Sd')−(Sb'+Sc) in the second embodiment has the pre-pit detectable range m2 in the same manner as the first embodiment.

Consequently, according to the pre-pit apparatus of the second embodiment, in the same manner as the first embodiment, since the enough detection margin can be ensured in the pre-pit detector 200 against the influence of the noise etc., the detection accuracy can be certainly improved, and the excellent detection capability can be realized.

In the above described first and second embodiment, the pre-pit 3 is the phase pit while the information pit is not the phase pit but is the pit, to which the information is recorded by modulating the reflection coefficient in dependence upon the crystal status or the amorphous status of the recording layer of the DVD-RW. Otherwise, it is difficult to improve the detection accuracy as described above. This point is explained with reference to FIG. 7.

Figure 7:
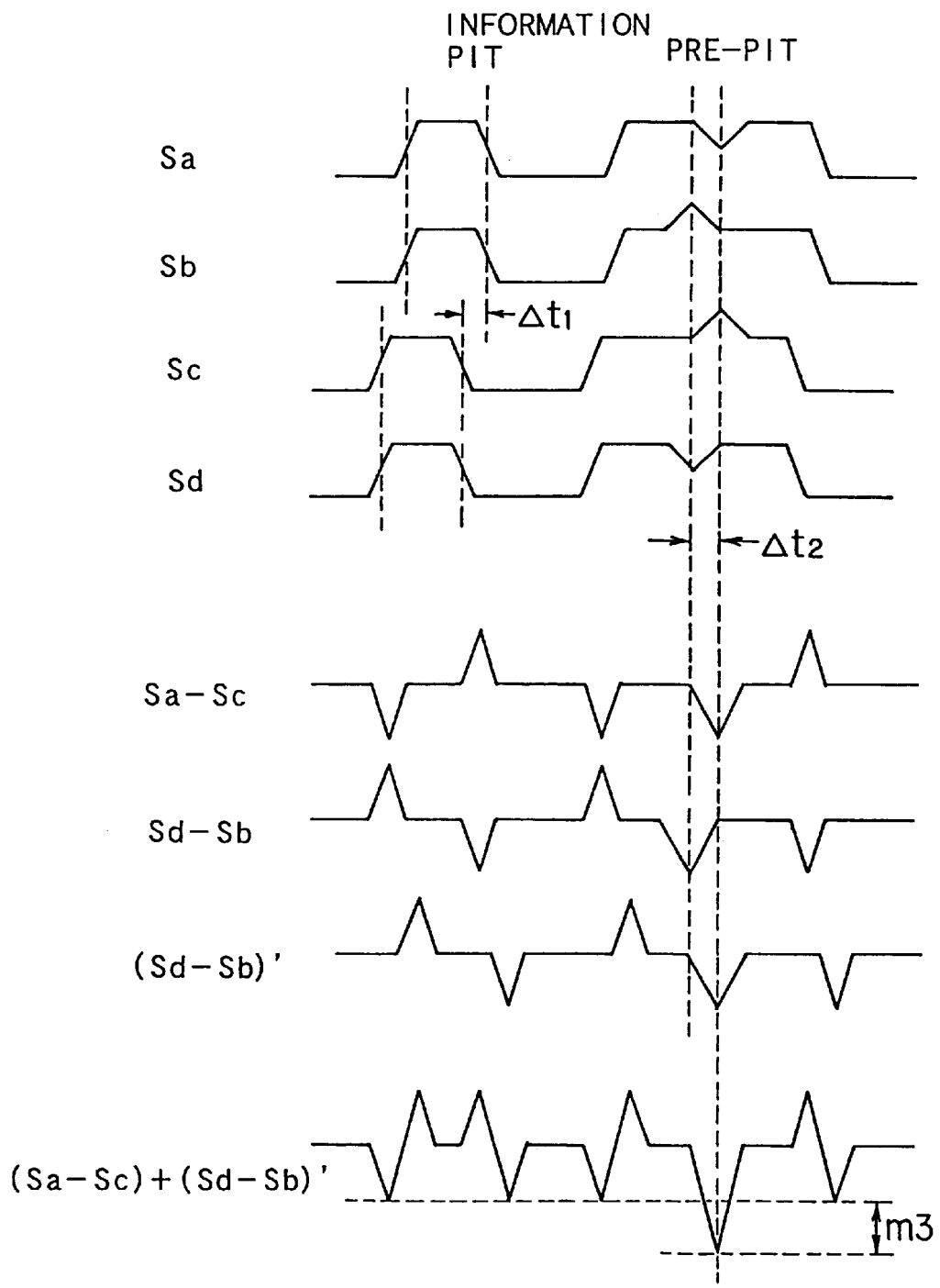
FIG. 7 is a pattern diagram of detection signals in a pre-pit detection in case of applying the pre-pit detecting apparatus of the first embodiment to a DVD-R.

FIG. 7 is a diagram to explain a case in which the pre-pit detection same as the first embodiment is performed with respect to the DVD-R (DVD-Recordable). Namely, in case of the DVD-R, since both of the information pit and the pre-pit are the phase pits shaped in the concave and convex shape, the above mentioned required condition is not satisfied. In the explanation hereinbelow, the relationship between the division shape of the light receiving element of four divided type used in the pre-pit detecting apparatus and the beam spot are the same as those of the first and second embodiments (refer to FIG. 2).

As shown in FIG. 7, the waveform patterns of the light detection signals Sa to Sd are the same as those of the comparison example of FIG. 4. The detection patterns at the time of detecting the information pit change such that the light detection signals Sa and Sb are delayed by Δt1 with respect to the detection signals Sc and Sd in the forward advancing direction, while the detection patterns at the time of detecting the pre-pit change such that the light detection signals Sa and Sc are delayed by Δt2 with respect to the light detection signals Sb and Sd in the forward advancing direction. At this time, it is assumed that the pre-pit detection is performed by using the structure of the first embodiment as shown in FIG. 1. At first, in each of the difference signal Sa−Sc outputted from the subtracter 10 and the difference signal Sd−Sb outputted from the subtracter 11, a pulse appears at the edge of the detection pattern of the information pit in addition to the changing component corresponding to the pre-pit 3. This is because the information pit is the phase pit, and each of the positional relationship between the light detection area A and the light detection area C and the positional relationship between the light detection area B and the light detection area D is forward and backward relationship respectively with respect to the advancing direction of the light beam, so that the waveform patterns are shifted in the time axis to each other respectively by the delay time Δt1.

Then, after outputting the correct difference signal (Sd−Sb)' by the programmable delay line 12 so as to cancel the delay time Δt2 of the pre-pit, the pre-pit detection signal (Sa−Sc)+(Sd−Sb)' outputted from the adder 14 by adding the difference signal Sa−Sc and the corrected difference signal (Sd−Sb)' together.

In the pre-pit detection signal (Sa−Sc)+(Sd−Sb)' obtained in this manner, although the change corresponding to the pre-pit detectable range m2 appears in the similar manner as the first embodiment of FIG. 2, a large number of pulses due to the influence of the detection patterns of the information pit is included in addition to this change. By this, the pre-pit 3 may be erroneously detected in the pre-pit detector 200, since only the pre-pit detectable range m3 can be reserved which is obtained by subtracting this error amount of the information pit from the pre-pit detectable range m2. Therefore, it is understood that it is difficult to apply the structure of the first embodiment of FIG. 1 to the pre-pit detection of the DVD-R.

Next, modified embodiments of the first and second embodiments are described with reference to FIGS. 8(a) and (b) and FIG. 9(a) to (f).

Figure 8:
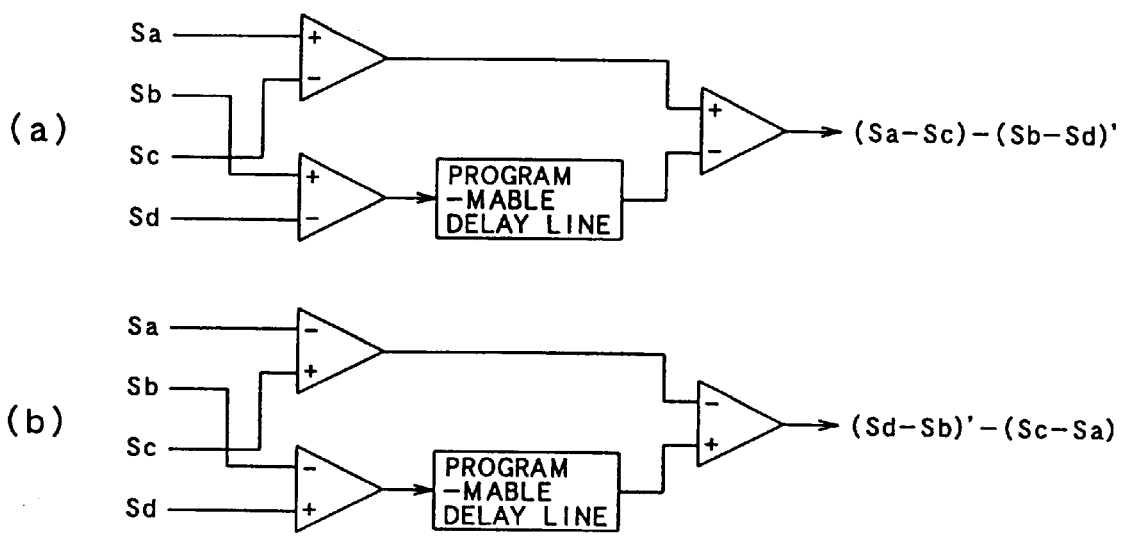
FIGS. 8(a) and (b) are block diagrams each showing a signal processing section of a modified embodiment of the first embodiment of FIG. 1.

Each of FIGS. 8(a) and (b) shows a schematic construction of a signal processing section including subtracters and programmable delay lines of a modified embodiment of the first embodiment of FIG. 1. The structure of each of these modified embodiments is such that the order of the adding and subtracting operations are changed with respect to the first embodiment of the present invention, so that the pre-pit detection signal which is equivalent to (Sa−Sc)+(Sd−Sb)' i.e., (Sa−Sc)−(Sb−Sd)' in case of FIG. 8(a) and (Sd−Sb)'−(Sc−Sa) in case of FIG. 8(b) can be obtained. Thus, in the same manner as the above described first embodiment, the pre-pit detection can be performed in these modified embodiments.

Figure 9:
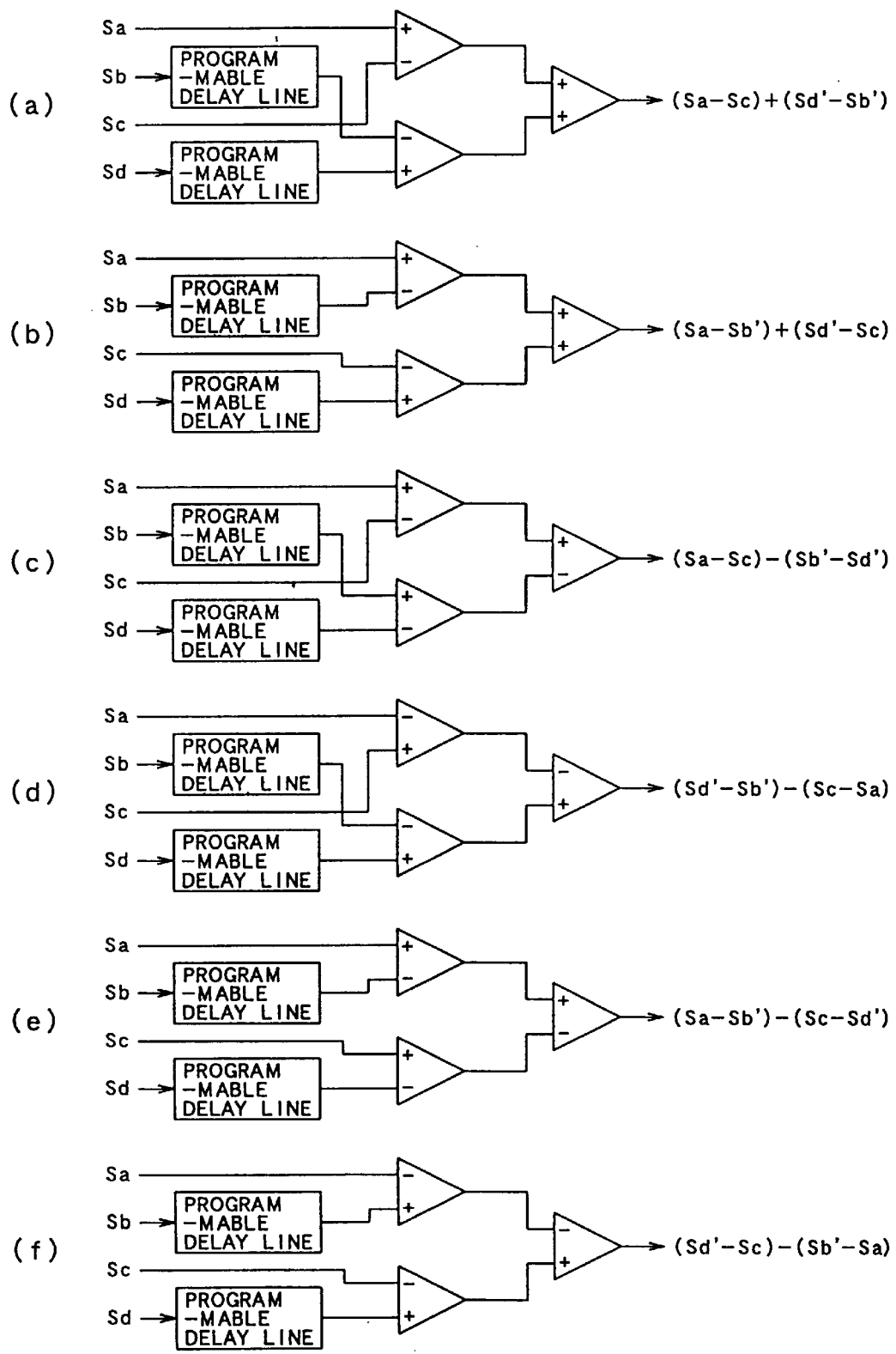
FIGS. 9(a) to (f) are block diagrams each showing a signal processing section of a modified embodiment of the second embodiment of FIG. 5.

Each of FIGS. 9(a) and (f) shows a schematic construction of a signal processing section including programmable delay lines, subtracters and adders of a modified embodiment of the second embodiment of FIG. 5. The structure of each of these modified embodiments is such that the order of the adding and subtracting operations are changed with respect to the second embodiment of the present invention, so that the pre-pit detection signal which is equivalent to (Sa+Sd')−(Sb'+Sc) i.e., (Sa−Sc)+(Sd'−Sb') in case of FIG. 9(a), (Sa−Sb')+(Sd'−Sc) in case of FIG. 9(b), (Sa−Sc)−(Sb'−Sd') in case of FIG. 9(c), (Sd'−Sb')−(Sc−Sa) in case of FIG. 9(d), (Sa−Sb')−(Sc−Sd') in case of FIG. 9(e) and (Sd'−Sc)−(Sb'−Sa) in case of FIG. 9(f) can be obtained. Thus, in the same manner as the above described second embodiment, the pre-pit detection can be performed in these modified embodiments.

Figure 10:
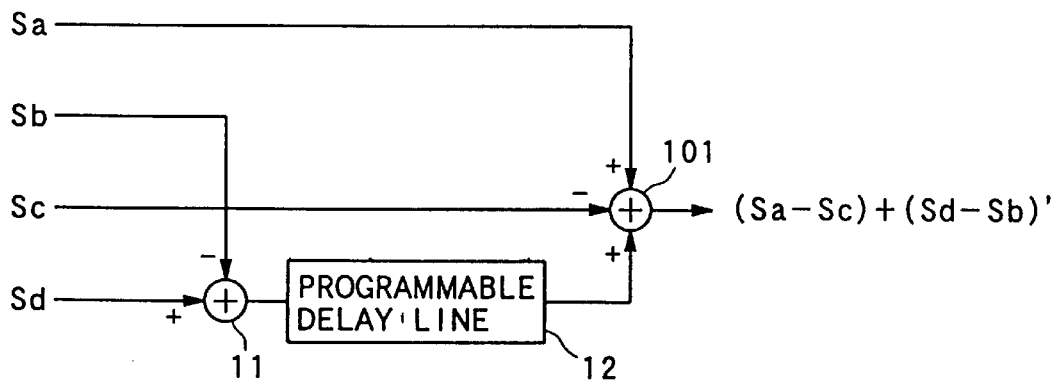
FIG. 10A is a block diagram of a signal processing section of a pre-pit detecting apparatus as a third embodiment of the present invention.
FIG. 10B is a block diagram of a signal processing section of a pre-pit detecting apparatus as a fourth embodiment of the present invention.
Figure 10:
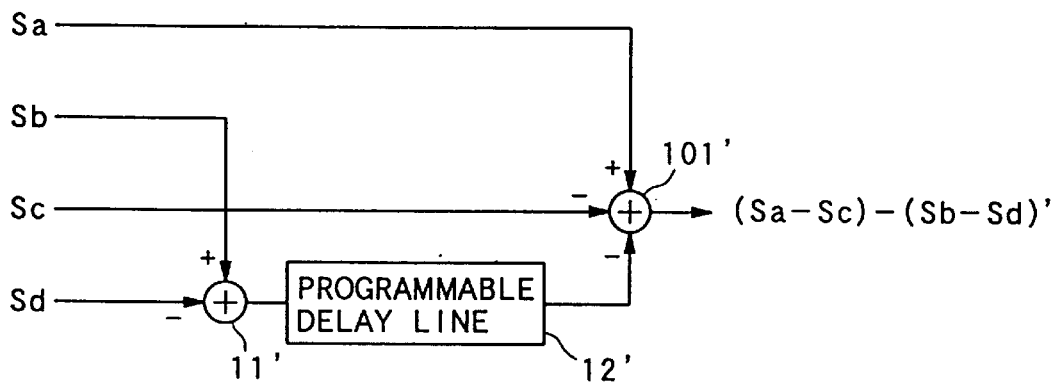

Next, a third embodiment of the present invention is explained with reference to FIG. 10A. In FIG. 10A, the same constitutional elements as those of the first embodiment of FIG. 1 carry the same reference numerals and the explanations thereof are omitted.

In FIG. 10A, the signal processing section of the pre-pit detection apparatus is provided with a subtracter 11, a programmable delay line 12 and an operation unit 101. From the operation unit 101, a pre-pit detection signal Sa−Sc+(Sd−Sb)' is outputted. Accordingly, in the same manner as the above described first embodiment, the pre-pit detection can be performed on the basis of the pre-pit detection signal Sa−Sc+(Sd−Sb)'.

Next, a fourth embodiment of the present invention is explained with reference to FIG. 10B. In FIG. 10B, the same constitutional elements as those of the first embodiment of FIG. 1 carry the same reference numerals and the explanations thereof are omitted.

In FIG. 10B, the signal processing section of the pre-pit detection apparatus is provided with a subtracter 11', a programmable delay line 12' and an operation unit 101'. From the operation unit 101', a pre-pit detection signal Sa−Sc−(Sb−Sd)' is outputted. Accordingly, in the same manner as the above described first embodiment, the pre-pit detection can be performed on the basis of the pre-pit detection signal Sa−Sc−(Sb−Sd)'.

Figure 11:
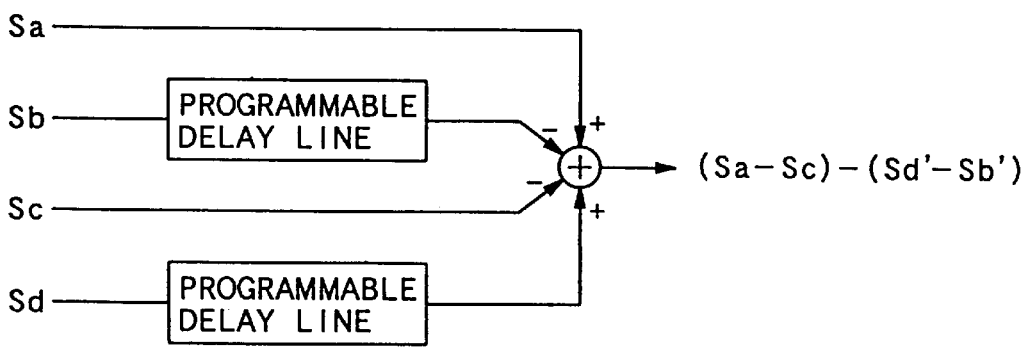
FIG. 11 is a block diagram of a signal processing section of a pre-pit detecting apparatus as a fifth embodiment of the present invention.

Next, a fifth embodiment of the present invention is explained with reference to FIG. 11. In FIG. 11, the same constitutional elements as those of the second embodiment of FIG. 5 carry the same reference numerals and the explanations thereof are omitted.

In FIG. 11, the signal processing section of the pre-pit detection apparatus is provided with programmable delay lines 20 and 21 and an operation unit 102. From the operation unit 102, a pre-pit detection signal Sa−Sc+(Sd'−Sb') is outputted. Accordingly, in the same manner as the above described second embodiment, the pre-pit detection can be performed on the basis of the pre-pit detection signal Sa−Sc+(Sd'−Sb').

As described above in detail, according to the pre-pit detection with respect to the DVD-RW by using the pre-pit detecting apparatus of the present embodiment, the delay of the pre-pit detection timing for each of the four divided detection areas A to D of the light receiving element 100 is corrected, and the pre-pit detection signal is obtained by performing a predetermined adding and subtracting operation. As a result, only the changing component due to the information pit which is not the phase pit can be removed at the time of detecting the pre-pit 3, while the changing component due to the pre-pit 3 which is the phase pit becomes the pre-pit detectable range at the time of detecting the pre-pit 3. Hence, a large detection margin can be reserved. Thus, it is possible to reduce the possibility of erroneous detection of the pre-pit 3 in accompaniment with the fluctuation of the light detection signals Sa to Sd due to the noise or the like.

Incidentally, although the present invention is applied to the DVD-RW which is cable of repeatedly recording the record information in the present embodiments, it is also possible to apply the present invention to an information record medium on which the pre-pit 3 is formed as the phase pit while the information is recorded as the change in the reflection coefficient, besides the DVD-RW.

Further, it is possible to apply the present invention to not only the information record medium in which the phase change is not generated by the information pit (i.e., in which the information pit is not the phase pit) but also the information record medium in which the phase change at the information pit is so little as to satisfy a condition of m3>m1, so that the similar advantageous effect can be obtained. Furthermore, it is possible to apply the present invention to the information record medium in which the information is the phase pit, as long as the depth of the phase pit is equal to $\lambda/4n$ ($\lambda$: wavelength of the light beam, n: natural number), so that the similar advantageous effect can be obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-72795 filed on Mar. 20, 1998 including the specification, claims, drawings and summary is incorporated herein by reference in its entirety.

What is claimed is:

1. A pre-pit detecting apparatus for detecting a pre-pit on an information record medium comprising (i) a record track on which record information can be recorded and (ii) a guide track which is to guide a light beam onto the record track and on which the pre-pit to record control information is formed in advance of recording the record information, said apparatus comprising:

a light receiving device having four divided light detection areas each for receiving a reflection light of the light beam emitted on the record track, said four divided light detection areas being divided such that the reflection light beam at the light receiving device is divided by a first division line which is optically in substantially parallel to the record track and a second division line which is optically in substantially orthogonal to the record track, said four divided light detection areas having a first division area optically positioned on a side, which is close to the guide track where the pre-pit is formed, of the first division line and on a side, which is opposite to an advancing direction of the light beam, of the second division line, a second division area positioned on a side, which is opposite to the guide track where the pre-pit is formed, of the first division line and on the side, which is opposite to the advancing direction of the light beam, of the second division line, a third division area positioned on the side, which is opposite to the guide track where the pre-pit is formed, of the first division line and on a side, which is in the advancing direction of the light beam, of the second division line, and a fourth division area positioned on the side, which is close to the guide track where the pre-pit is formed, of the first division line and on the side, which is in the advancing direction of the light beam, of the second division line, said light receiving device outputting first to fourth light detection signals corresponding to the first to the fourth division areas respectively;

a first difference signal generation device for generating a first difference signal by subtracting the third light detection signal from the first light detection signal;

a second difference signal generation device for generating a second difference signal by subtracting the second light detection signal from the fourth light detection signal;

a correction device for delaying the second difference signal by a delay time, which is set in advance in correspondence with a time difference between a light receiving timing of the light receiving device on the side, which is in the advancing direction of the light beam, of the second division line and that on the side, which is opposite to the advancing direction of the light beam, of the second division line, to output the delayed second difference signal;

a pre-pit detection signal output device for adding the first difference signal and the delayed second difference signal to output it as a pre-pit detection signal; and a pre-pit detector for detecting the pre-pit on the basis of the pre-pit detection signal by using a predetermined threshold.

2. An apparatus according to claim 1, wherein the pre-pit comprises a phase pit shaped in a concave and convex shape of the guide track while the record information is recorded as a change in a reflection coefficient of the record track.

3. An apparatus according to claim 1, wherein the record track comprises a groove track, and the guide track comprises a land track.

4. An apparatus according to claim 1, wherein the correction device comprises a programmable delay line controlled by a CPU.

5. A pre-pit detecting apparatus for detecting a pre-pit on an information record medium comprising (i) a record track on which record information can be recorded and (ii) a guide track which is to guide a light beam onto the record track and on which the pre-pit to record control information is formed in advance of recording the record information, said apparatus comprising:

a light receiving device having four divided light detection areas each for receiving a reflection light of the light beam emitted on the record track, said four divided light detection areas being divided such that the reflection light beam at the light receiving device is divided by a first division line which is optically in substantially parallel to the record track and a second division line which is optically in substantially orthogonal to the record track, said four divided light detection areas having a first division area optically positioned on a side, which is close to the guide track where the pre-pit is formed, of the first division line and on a side, which is opposite to an advancing direction of the light beam, of the second division line, a second division area positioned on a side, which is opposite to the guide track where the pre-pit is formed, of the first division line and on the side, which is opposite to the advancing direction of the light beam, of the second division line, a third division area positioned on the side, which is opposite to the guide track where the pre-pit is formed, of the first division line and on a side, which is in the advancing direction of the light beam, of the second division line, and a fourth division area positioned on the side, which is close to the guide track where the pre-pit is formed, of the first division line and on the side, which is in the advancing direction of the light beam, of the second division line, said light receiving device outputting first to fourth light detection signals corresponding to the first to the fourth division areas respectively;

a first correction device for delaying the second light detection signal by a delay time, which is set in advance in correspondence with a time difference between a light receiving timing of the light receiving device on the side, which is in the advancing direction of the light beam, of the second division line and that on the side, which is opposite to the advancing direction of the light beam, of the second division line, to output the delayed second light detection signal;

a second correction device for delaying the fourth light detection signal by the delay time, to output the delayed fourth light detection signal;

a first addition device for adding the first light detection signal and the delayed fourth light detection signal to output it as a first addition signal;

a second addition device for adding the third light detection signal and the delayed second light detection signal to output it as a second addition signal;

a pre-pit detection signal output device for generating a pre-pit detection signal by subtracting the second addition signal from the first addition signal; and a pre-pit detector for detecting the pre-pit on the basis of the pre-pit detection signal by using a predetermined threshold.

6. An apparatus according to claim 5, wherein the pre-pit comprises a phase pit shaped in a concave and convex shape of the guide track while the record information is recorded as a change in a reflection coefficient of the record track.

7. An apparatus according to claim 5, wherein the record track comprises a groove track, and the guide track comprises a land track.

8. An apparatus according to claim 5, wherein each of the first and second correction devices comprises a programmable delay line controlled by a CPU.

9. A pre-pit detecting apparatus for detecting a pre-pit on an information record medium comprising (i) a record track on which record information can be recorded and (ii) a guide track which is to guide a light beam onto the record track and on which the pre-pit to record control information is formed in advance of recording the record information, said apparatus comprising:

a light receiving device having four divided light detection areas each for receiving a reflection light of the light beam emitted on the record track, said four divided light detection areas being divided such that the reflection light beam at the light receiving device is divided by a first division line which is optically in substantially parallel to the record track and a second division line which is optically in substantially orthogonal to the record track, said four divided light detection areas having a first division area optically positioned on a side, which is close to the guide track where the pre-pit is formed, of the first division line and on a side, which is opposite to an advancing direction of the light beam, of the second division line, a second division area positioned on a side, which is opposite to the guide track where the pre-pit is formed, of the first division line and on the side, which is opposite to the advancing direction of the light beam, of the second division line, a third division area positioned on the side, which is opposite to the guide track where the pre-pit is formed, of the first division line and on a side, which is in the advancing direction of the light beam, of the second division lines and a fourth division area positioned on the side, which is close to the guide track where the pre-pit is formed, of the first division line and on the side, which is in the advancing direction of the light beam, of the second division line, said light receiving device outputting first to fourth light detection signals corresponding to the first to the fourth division areas respectively;

a difference signal generation device for generating a difference signal by subtracting the second light detection signal from the fourth light detection signal;

a correction device for delaying the difference signal by a delay time, which is set in advance in correspondence with a time difference between a light receiving timing of the light receiving device on the side, which is in the advancing direction of the light beam, of the second division line and that on the side, which is opposite to the advancing direction of the light beam, of the second division line, to output the delayed difference signal;

a pre-pit detection signal output device for outputting the first light detection signal−the third light detection signal+the delayed difference signal as a pre-pit detection signal; and a pre-pit detector for detecting the pre-pit on the basis of the pre-pit detection signal by using a predetermined threshold.

10. A pre-pit detecting apparatus for detecting a pre-pit on an information record medium comprising (i) a record track on which record information can be recorded and (ii) a guide track which is to guide a light beam onto the record track and on which the pre-pit to record control information is formed in advance of recording the record information, said apparatus comprising:

a light receiving device having four divided light detection areas each for receiving a reflection light of the light beam emitted on the record track, said four divided light detection areas being divided such that the reflection light beam at the light receiving device is divided by a first division line which is optically in substantially parallel to the record track and a second division line which is optically in substantially orthogonal to the record track, said four divided light detection areas having a first division area optically positioned on a side, which is close to the guide track where the pre-pit is formed, of the first division line and on a side, which is opposite to an advancing direction of the light beam, of the second division line, a second division area positioned on a side, which is opposite to the guide track where the pre-pit is formed, of the first division line and on the side, which is opposite to the advancing direction of the light beam, of the second division line, a third division area positioned on the side, which is opposite to the guide track where the pre-pit is formed, of the first division line and on a side, which is in the advancing direction of the light beam, of the second division lines and a fourth division area positioned on the side, which is close to the guide track where the pre-pit is formed, of the first division line and on the side, which is in the advancing direction of the light beam, of the second division line, said light receiving device outputting first to fourth light detection signals corresponding to the first to the fourth division areas respectively;

a difference signal generation device for generating a difference signal by subtracting the fourth light detection signal from the second light detection signal;

a correction device for delaying the difference signal by a delay time, which is set in advance in correspondence with a time difference between a light receiving timing of the light receiving device on the side, which is in the advancing direction of the light beam, of the second division line and that on the side, which is opposite to the advancing direction of the light beam, of the second division line, to output the delayed difference signal;

a pre-pit detection signal output device for outputting the first light detection signal−the third light detection signal−the delayed difference signal as a pre-pit detection signal; and a pre-pit detector for detecting the pre-pit on the basis of the pre-pit detection signal by using a predetermined threshold.

11. A pre-pit detecting apparatus for detecting a pre-pit on an information record medium comprising (i) a record track on which record information can be recorded and (ii) a guide track which is to guide a light beam onto the record track and on which the pre-pit to record control information is formed in advance of recording the record information, said apparatus comprising:

a light receiving device having four divided light detection areas each for receiving a reflection light of the light beam emitted on the record track, said four divided light detection areas being divided such that the reflection light beam at the light receiving device is divided by a first division line which is optically in substantially parallel to the record track and a second division line which is optically in substantially orthogonal to the record track, said four divided light detection areas having a first division area optically positioned on a side, which is close to the guide track where the pre-pit is formed, of the first division line and on a side, which is opposite to an advancing direction of the light beam, of the second division line, a second division area positioned on a side, which is opposite to the guide track where the pre-pit is formed, of the first division line and on the side, which is opposite to the advancing direction of the light beam, of the second division line, a third division area positioned on the side, which is opposite to the guide track where the pre-pit is formed, of the first division line and on a side, which is in the advancing direction of the light beam, of the second division line, and a fourth division area positioned on the side, which is close to the guide track where the pre-pit is formed, of the first division line and on the side, which is in the advancing direction of the light beam, of the second division line, said light receiving device outputting first to fourth light detection signals corresponding to the first to the fourth division areas respectively;

a first correction device for delaying the second light detection signal by a delay time, which is set in advance in correspondence with a time difference between a light receiving timing of the light receiving device on the side, which is in the advancing direction of the light beam, of the second division line and that on the side, which is opposite to the advancing direction of the light beam, of the second division line, to output the delayed second light detection signal;

a second correction device for delaying the fourth light detection signal by the delay time, to output the delayed fourth light detection signal;

a pre-pit detection signal output device for outputting the first light detection signal−the third light detection signal+the delayed fourth light detection signal−the delayed second light detection signal as a pre-pit detection signal; and a pre-pit detector for detecting the pre-pit on the basis of the pre-pit detection signal by using a predetermined threshold.

12. A pre-pit detecting apparatus for detecting a pre-pit on an information record medium comprising (i) a record track on which record information can be recorded and (ii) a guide track which is to guide a light beam onto the record track and on which the pre-pit to record control information is formed in advance of recording the record information, said apparatus comprising:

a light receiving device having four divided light detection areas each for receiving a reflection light of the light beam emitted on the record track, said four divided light detection areas being divided such that the reflection light beam at the light receiving device is divided by a first division line which is optically in substantially parallel to the record track and a second division line which is optically in substantially orthogonal to the record track, said four divided light detection areas having a first division area optically positioned on a side, which is close to the guide track where the pre-pit is formed, of the first division line and on a side, which is opposite to an advancing direction of the light beam, of the second division line, a second division area positioned on a side, which is opposite to the guide track where the pre-pit is formed, of the first division line and on the side, which is opposite to the advancing direction of the light beam, of the second division line, a third division area positioned on the side, which is opposite to the guide track where the pre-pit is formed, of the first division line and on a side, which is in the advancing direction of the light beam, of the second division line, and a fourth division area positioned on the side, which is close to the guide track where the pre-pit is formed, of the first division line and on the side, which is in the advancing direction of the light beam, of the second division line, said light receiving device outputting first to fourth light detection signals $Sa$, $Sb$, $Sc$ and $Sd$ corresponding to the first to the fourth division areas respectively;

means for generating a pre-pit detection signal that shows the first light detection signal $Sa$−a delayed second light detection signal $Sb'$ of the second light detection signal $Sb$−the third light detection signal $Sc$+a delayed fourth light detection signal $Sd'$ of the fourth light detection signal $Sd$; and a pre-pit detector for detecting the pre-pit on the basis of the pre-pit detection signal by using a predetermined threshold.

13. An apparatus according to claim 12, wherein said generating means comprises:

a first difference signal generation device for generating a first difference signal by subtracting the third light detection signal $Sc$ from the first light detection signal $Sa$;

a second difference signal generation device for generating a second difference signal by subtracting the second light detection signal $Sb$ from the fourth light detection signal $Sd$;

a correction device for delaying the second difference signal by a delay time to output the delayed second difference signal; and a pre-pit detection signal output device for adding the first difference signal and the delayed second difference signal to output it as the pre-pit detection signal.

14. An apparatus according to claim 13, wherein the delay time is set in advance in correspondence with a time difference between a light receiving timing of the light receiving device on the side, which is in the advancing direction of the light beam, of the second division line and that on the side, which is opposite to the advancing direction of the light beam, of the second division line.

15. An apparatus according to claim 12, wherein said generating means comprises:
- a first correction device for delaying the second light detection signal Sb by a delay time to output the delayed second light detection signal Sb';
- a second correction device for delaying the fourth light detection signal Sd by the delay time, to output the delayed fourth light detection signal Sd';
- a first addition device for adding the first light detection signal Sa and the delayed fourth light detection signal Sd' to output it as a first addition signal;
- a second addition device for adding the third light detection signal Sc and the delayed second light detection signal Sb' to output it as a second addition signal; and
- a pre-pit detection signal output device for outputting the pre-pit detection signal by subtracting the second addition signal from the first addition signal.

16. An apparatus according to claim 15, wherein the delay time is set in advance in correspondence with a time difference between a light receiving timing of the light receiving device on the side, which is in the advancing direction of the light beam, of the second division line and that on the side, which is opposite to the advancing direction of the light beam, of the second division line.

* * * * *